July 24, 1934.   W. S. DARLEY   1,967,503
LADDER TRUCK
Filed June 18, 1932   2 Sheets-Sheet 1
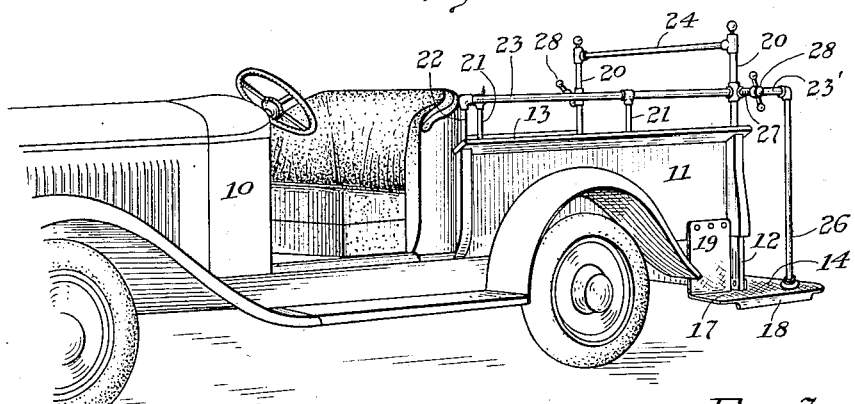
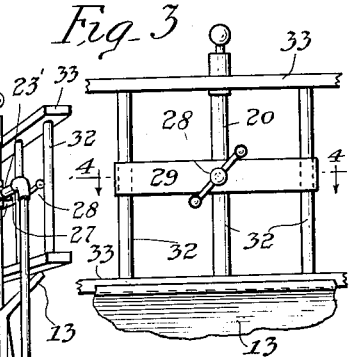
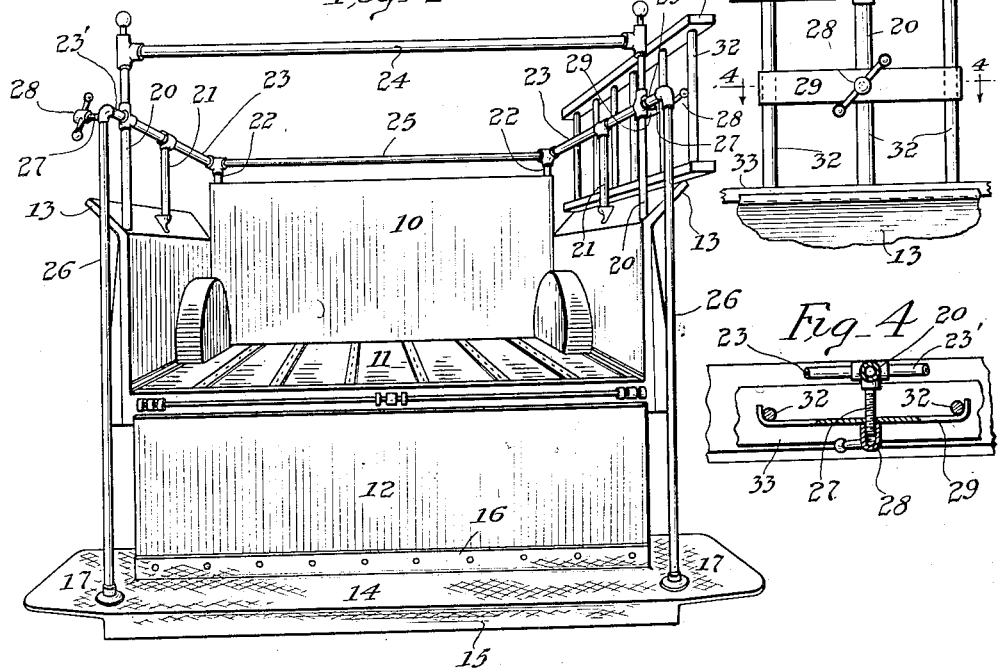
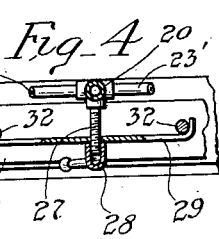
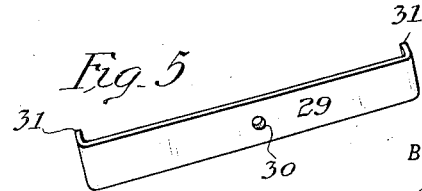
INVENTOR.
William S. Darley
BY
Brayton Richards
ATTORNEY.

July 24, 1934.  W. S. DARLEY  1,967,503
LADDER TRUCK
Filed June 18, 1932  2 Sheets-Sheet 2
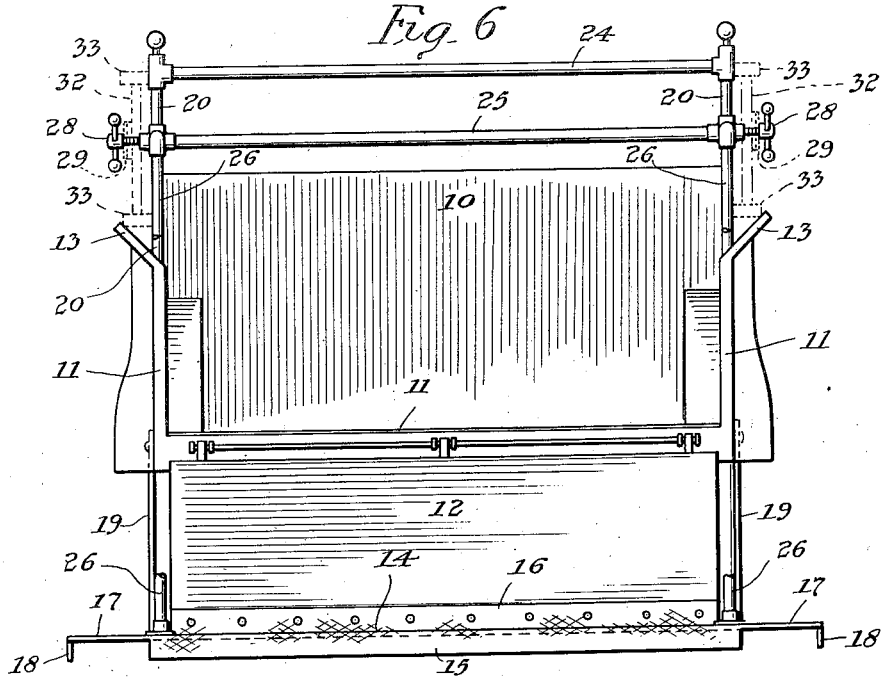
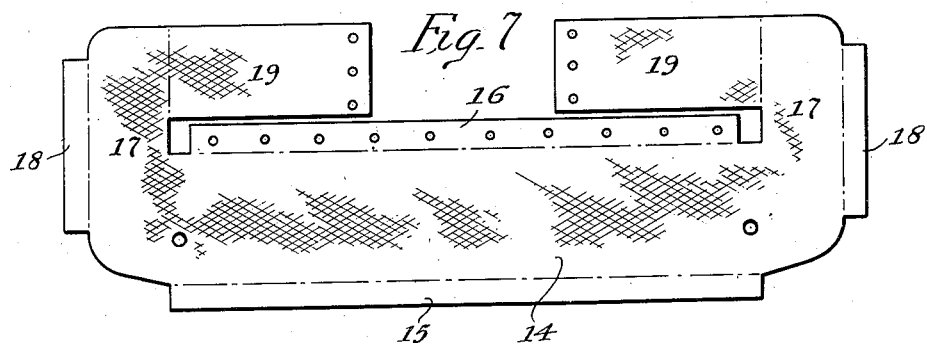
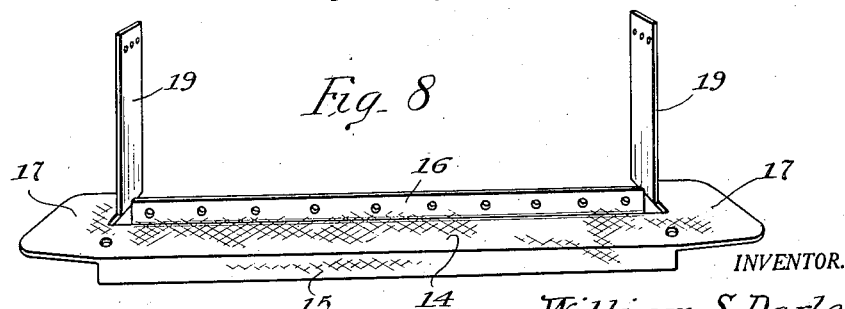
INVENTOR.
BY William S. Darley
Brayton Richards
ATTORNEY.

Patented July 24, 1934

1,967,503

UNITED STATES PATENT OFFICE 1,967,503

LADDER TRUCK

William S. Darley, Chicago, Ill.

Application June 18, 1932, Serial No. 618,061

3 Claims. (Cl. 280—4)

The invention relates to improvements in fire trucks and has for its primary object the provision of an improved construction of the character indicated by means of which a vehicle in the form of an ordinary automobile truck or the like, may be readily converted into a suitable ladder truck for fire extinguishing purposes. Another object of the invention is the provision of improved attachments for vehicle trucks of the character indicated, whereby the same may be readily converted into ladder trucks for fire extinguishing purposes and so constructed and arranged as to provide a simple and highly efficient truck of the character indicated, which is capable of economical manufacture.

Other objects will appear hereinafter.

The invention consists in the combinations and arrangements of parts hereinafter described and claimed.

The invention will be best understood by reference to the accompanying drawings forming a part of this specification and in which:

Fig. 1 is a side, perspective view of an automobile ladder truck embodying the invention;

Fig. 2 a rear perspective view of the same;

Fig. 3 a detail view illustrating one of two clamping members employed in the construction;

Fig. 4 a section taken substantially on line 4—4 of Fig. 3;

Fig. 5 a perspective view of a clamping bar employed in the construction;

Fig. 6 a rear elevation of the truck;

Fig. 7 a plan view of a blank from which the main supporting platform of the truck is constructed; and Fig. 8 a perspective view of said supporting platform, complete and detached.

The embodiment of the invention illustrated in the drawings comprises an automobile truck 10 of conventional form and having the usual truck body 11 provided with the usual tail gate 12 and the usual flare boards 13 at the tops of its sides.

The usual tail gate 12 of the truck body 11 is arranged in depending or opened position as shown, and the supporting platform or step 14 is secured to the lower edge of said tail gate to project rearwardly therefrom. The supporting platform 14 is formed from a blank of sheet metal, best shown in Figs. 7 and 8. As shown, this blank comprises a main supporting platform member 14 having a reinforcing lip or flange portion 15 at its rear edge bent downwardly to reinforce the rear edge of the platform. At its front edge the platform 14 is provided with an upwardly bent, perforated securing lip or flange 16 which is bolted or otherwise secured to the lower rear edge of the tail gate 12, as shown. At each end the platform 14 is provided with forward extensions 17 arranged to extend around and below the rear corners of the truck body, the outer edges of said extension 17 being provided with depending reinforcing lips or flanges 18.

At their inner forward edges the extensions 17 are provided with upwardly extending integral perforated flanges 19 adapted and arranged to be bolted or otherwise secured to the sides of the truck body 11 and to constitute combined braces and hangers for the ends of the platform 14.

As will be noted, I thus provide a supporting platform made from a single blank of sheet metal provided with a central gap in its forward side to fit around the lower edge of the depending tail gate of the truck, portions of the blank removed to form the gap being integral with the blank at the edges of the gap and bent upwardly to form securing flanges to be secured to the sides of the truck. When the platform thus provided is properly secured in place, not only is a suitable step platform provided supported on the tail gate of the truck, but the platform and tail gate are anchored to the truck body to prevent swinging of the tail gate and also further reinforce the mounting of the step platform. In this way a simple and effective construction is provided whereby an ordinary truck may be readily and economically equipped with a step platform of a highly desirable character.

Supporting posts 20, 21 and 22 are arranged at each side of the truck body and a supporting rail 23 connects each set of posts above each flare board 13. The rear posts 20 are extended, as shown, above the rails 23 and are connected by a rear cross rail or brace 24, as shown. The forward posts 22 are also connected as shown by a cross brace or rail 25. Each supporter rail 23 is provided with a rear extension 23' to which is secured a depending combined handle and brace member 26 secured at its bottom as shown to the corresponding rear portion of the platform 14, thereby bracing said platform and also constituting handles to facilitate the mounting of the platform and entry to the truck, as will be readily understood. Each post 20 is provided with an outwardly extending, threaded clamping stud 27 having a clamping head or nut 28 threaded thereupon. Co-operating with each stud 27 is a clamping bar 29 having a central perforation 30 to fit loosely over the stud and inwardly turned clamping lips 31 at its ends to engage the rounds 32 of a ladder 33 resting upon the corresponding flare board 13, as indicated.

By this arrangement, a simple and effective ladder truck for fire extinguishing purposes may be readily provided from an ordinary automobile truck of conventional design and whereby such ladder trucks of highly efficient construction may be readily and economically produced. The specific form and arrangement of parts is a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

I claim:

1. The combination with a vehicle body having a depending tail gate and flare boards at the tops of its sides, of a platform secured to said tail gate and projecting rearwardly therefrom; braces connecting the ends of said platform to the sides of said body; supporting posts at the front and rear ends of each of said flare boards; supporting rails connecting said posts; a clamp on one of said posts at each side arranged to clamp a ladder resting on the corresponding flare board; a rearward extension on each of said supporting rails; and depending combined handle and brace members connecting each of said rail extensions with the rear portion of said platform.

2. The combination with a vehicle body having a depending tail gate and flare board at the tops of its sides, of a platform formed of sheet metal shaped to form a main supporting member secured to the lower portion of said tail gate and projecting rearwardly therefrom, said supporting member being provided at its forward edge with a securing flange secured to said tail gate, the ends of said supporting member being provided with extensions extending around and below the rear corners of the body, said extensions being provided at their inner edges with upwardly extending bracing flanges secured to the sides of said body; supporting posts at the front and rear ends of each of said flare boards; supporting rails connecting said posts; a clamp on one of said posts at each side arranged to clamp a ladder resting on the corresponding flare board; a rear extension on each supporting rail; and depending combined handle and brace members secured to each rail extension and to the rear portion of said platform.

3. A supporting platform for fire trucks formed from a single blank of sheet metal provided with a central gap in its forward side to fit around the lower edge of the depending tail gate of the truck, portions of the blank removed to form the gap being integral with the blank at the edges of the gap and bent upwardly and outwardly to form securing flanges to be secured to the sides of the truck body.

WILLIAM S. DARLEY.